March 12, 1929.　　　J. W. WELSH　　　1,705,229
SPECTACLE TEMPLE
Original Filed June 13, 1923　　2 Sheets-Sheet 1
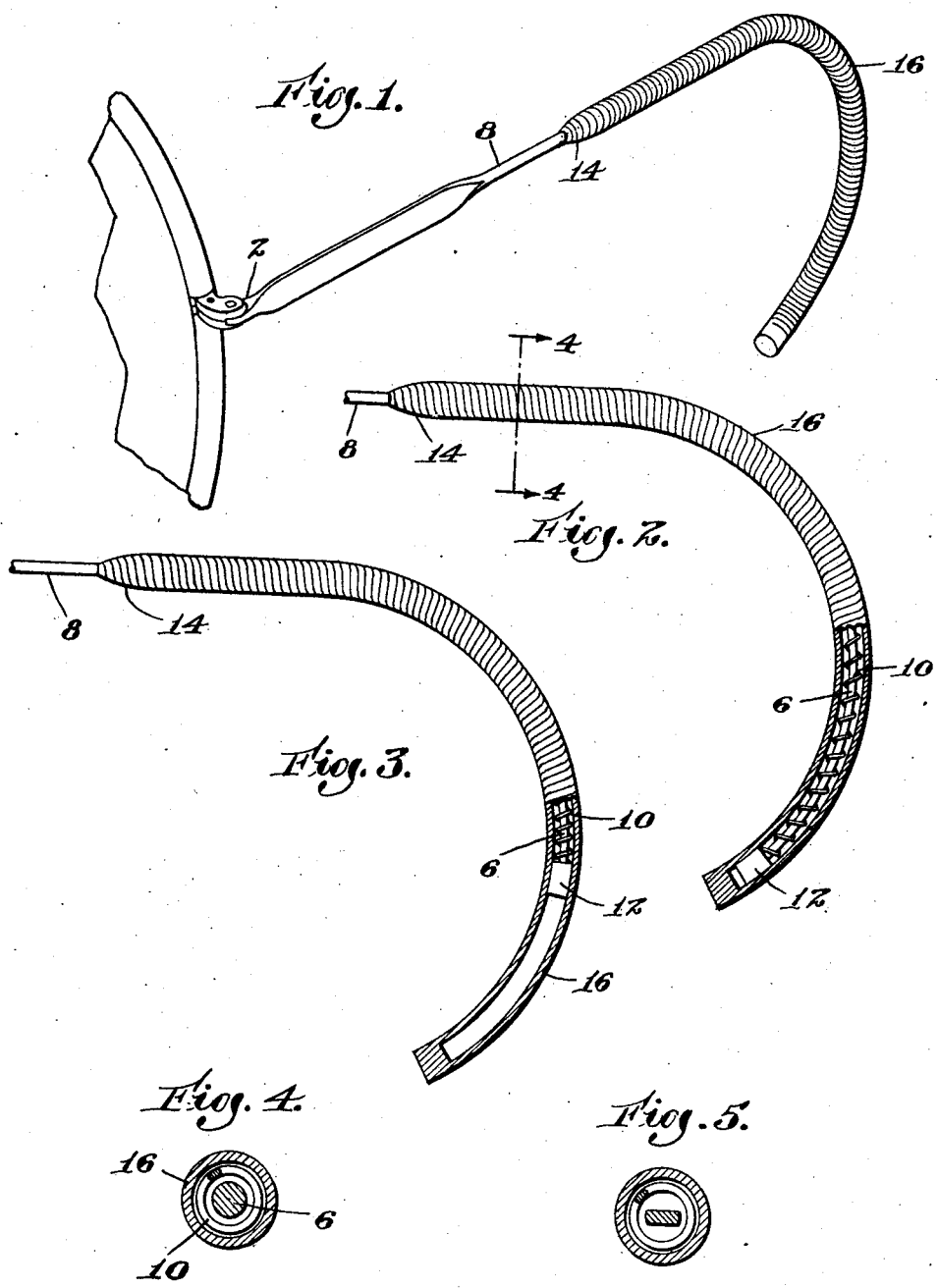
Inventor
James W. Welsh
by David Rines
Attorney March 12, 1929.  J. W. WELSH  1,705,229
SPECTACLE TEMPLE
Original Filed June 13, 1923   2 Sheets-Sheet 2

Inventor
James W. Welsh
by David Rines
Attorney

Patented Mar. 12, 1929.

1,705,229

UNITED STATES PATENT OFFICE.

JAMES WILSON WELSH, OF PROVIDENCE, RHODE ISLAND, ASSIGNOR TO BAUSCH & LOMB OPTICAL COMPANY, OF ROCHESTER, NEW YORK, A CORPORATION OF NEW YORK.

SPECTACLE TEMPLE.

Original application filed June 13, 1923, Serial No. 645,119. Divided and this application filed January 4, 1926. Serial No. 79,138.

The present invention relates to spectacle temples, and it has for its chief object to provide a new and improved temple that shall automatically adjust itself to the facial characteristics of the wearer. The present application is a division of a copending application Serial No. 645,119, filed June 13, 1923.

Figure 6:
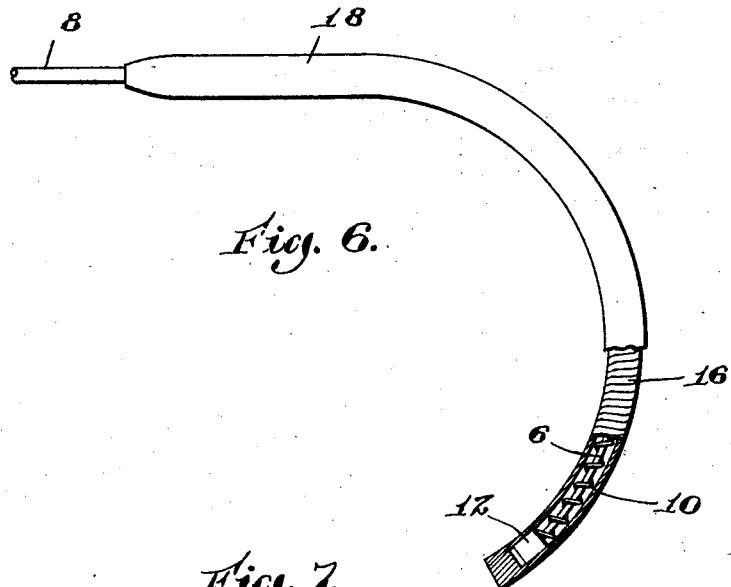
Figure 7:
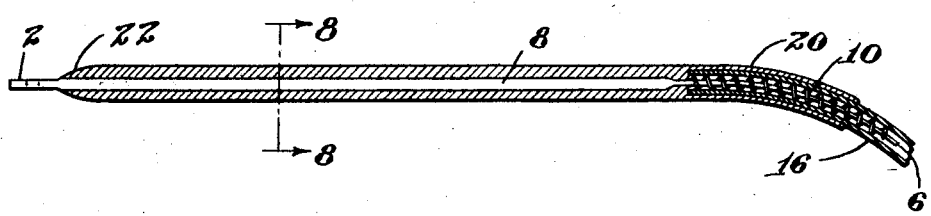
Figure 9:
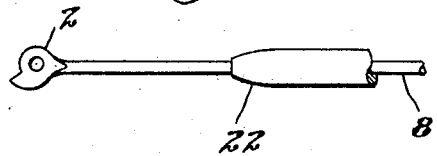
Figure 8:
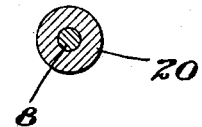

The invention will be better understood by reference to the accompanying drawings, in which Fig. 1 is a perspective view of a temple constructed according to a preferred embodiment of the present invention, shown hinged to a spectacle frame; Fig. 2 is a longitudinal section of the rear portion of the same; Fig. 3 is a view similar to Fig. 2, showing the parts in relatively different positions; Fig. 4 is an enlarged section taken upon the line 4—4 of Fig. 2; Fig. 5 is a section similar to Fig. 4 of a modification; Fig. 6 is a fragmentary elevation, partly in section, of a further modification; Fig. 7 is a view of a further modification; Fig. 8 is a section taken upon the line 8—8 of Fig. 7; and Fig. 9 is a fragmentary view of the temple shown in Fig. 7, with the parts in relatively different positions.

The temple is shown in Fig. 1 hinged at its forward end 2 to a spectacle frame, and its rear portion 16 is bent to engage behind the ear of the wearer. The parts of the temple automatically adjust themselves to the facial characteristics of the wearer, so that the same temple may be employed, without manual adjustment, for any wearer. To this end, the rear ear or other body-engaging member 16 is slidably mounted on the bent rear portion 6 of the temple rod 8. In order that the member 16 may be slidable upon the rear end 6 of the rod 8, it is necessary that either the rear end 6 or the member 16, or preferably both, be flexible. The member 16 is rendered flexible by constituting it of a helical coil or cable and the rear end 6 by making it of a lengthened-out rod. A spring 10 coiled about the rod 8 between an enlargement 12 at the rear end of the rod 8 and a contracted portion 14 of the tube 4 tends to maintain yieldingly the tube 4 at its forward limit of slidable movement, illustrated in Fig 2. In operation, the wearer places the spectacle frame before his eyes, grasps the members 16 with his hands, pulls them back, thereby compressing the springs 10, places the tubes 4 behind the ears, and allows the springs 10 to return the members 16 into engagement with the ears. By suitable tension of the springs 10, the members 16 may be caused to hold yieldingly against the ears with a gentle pressure, sufficient to maintain the spectacles in position before the eyes, yet not too great to cause discomfort.

Though the rear portion 6 of the rod 8 has been described as flexible, it will be understood that the portion of the body of the rod 8 along which the contracted portion 14 of the tube 4 slides should be more rigid, so that the member 16 may be caused to slide back and forth in substantially a straight line. The desired rigidity may be obtained in any of many well-known ways, which it is unnecessary here to describe. The flexibility of the rear portion 6 of the rod 8 may also be attained in many ways, such as by flattening, as illustrated in Fig. 5.

The flexible tube 16 is shown in Fig. 6 enclosed in a non-metal tube 18, to give the temple the appearance of zylonite and the like. The non-metal tube 18 may be applied to the tube 16 in many ways, such as by dipping in liquid zylonite and allowing the latter to solidify, and repeating the process until a sufficiently large body has been built up.

It is not essential that the tube 18 be formed by dipping. The corresponding tube 20 shown in Figs. 7 to 9 is applied in tube form, the member 16 and the tube 20 being rigidly connected together to slide as a unit. The tube 20 is, furthermore, extended over the rod 8 also, so as to give the temple an all-non-metallic appearance. As the spring 10 is compressed, the forward end 22 of the tube slides backward along the rod 8, as illustrated in Fig. 9, exposing the metal rod 8.

Other modifications, too, will occur to persons skilled in the art, and all such are considered to be within the spirit and scope of the present invention, as defined in the appended claims.

What is claimed is:

1. A pair of spectacles comprising a spectacle frame and a spectacle temple comprising a rod having a forward portion at which the temple is hinged to the frame and a rear portion bent to the shape of a temple, a helical body-engaging member slidably mounted upon the rear portion, means whereby slidable movement of the helical body-engaging member on the rear portion effects a temporary change of shape of the rear portion, and means yieldingly tending to maintain the body-engaging member at a forward limit of slidable movement.

2. A spectacle temple comprising a rod having a forward portion at which the temple is adapted to be hinged, a helical coil within which the rod is slidably mounted, means whereby slidable movement of the rod in the helical coil effects a temporary change of shape of the rod, and means yieldingly tending to maintain the coil at a forward limit of slidable movement.

3. A spectacle temple comprising a flexible rod having a forward portion at which the temple is adapted to be hinged and a rear portion, a flexible helical coil bent to the shape of a temple within which the rod is slidably mounted, the rod being more flexible than the coil, whereby slidable movement of the rod in the helical coil effects a temporary change of shape of the rod, and means yieldingly tending to maintain the coil at a forward limit of slidable movement.

4. A spectacle temple comprising a rod having a forward portion at which the temple is adapted to be hinged and a rear flexible portion, a helical coil bent to the shape of a temple within which the rod is slidably mounted, the flexible portion of the rod being adapted to flex relative to the coil to permit slidable movement of the coil upon the rod, and means yieldingly tending to maintain the coil at a forward limit of slidable movement.

5. A spectacle temple as defined in claim 4 in which the helical coil is enclosed within a non-metal tube.

6. A spectacle temple as defined in claim 4 in which the coil is rigidly enclosed within a non-metal tube that is slidably mounted over the forward portion.

7. A spectacle temple as defined in claim 4 in which the tending means comprises a coiled spring coiled about the rear flexible portion of the rod.

8. A spectacle temple comprising a rod having a forward portion at which the temple is adapted to be hinged and a rear portion bent to the shape of a temple, the rear part of the rear portion being curved and relatively flexible and the forward part of the rear portion being substantially straight and relatively rigid, a helical body-engaging member slidably mounted upon the rear portion, whereby a rearward sliding movement of the helical member will cause the relatively flexible curved portion to straighten out relatively, thereby increasing the distance of the curve of the rear portion from the forward end of the temple, and means yieldingly tending to maintain the body-engaging member at a forward limit of slidable movement, whereby the relatively straightened-out portion will return towards its original form when the helical member is permitted to slide back towards its forward limit of slidable movement.

9. A temple for spectacle frames having a tubular shank portion provided with a helical ear-engaging loop portion at one end of the shank and an abutment at the other end of the shank, a wire core in the tube to move endways therein and having one end extending beyond the end of the tube to be pivoted to the lens frame and the other end provided with an abutment, and a spring in the tube acting upon the core between the abutments to press the tubular shank towards contracted position but permitting a yielding extending action thereof.

In testimony whereof, I have hereunto subscribed my name.

JAMES W. WELSH.